United States Patent
Agapiou et al.

(10) Patent No.: US 10,717,913 B2
(45) Date of Patent: Jul. 21, 2020

(54) TREATMENT FLUIDS COMPRISING RECYCLED DRILLING CUTTINGS AND METHOD OF USE

(71) Applicant: Halliburton Energy Services, Inc., Houston, TX (US)

(72) Inventors: Kyriacos Agapiou, Houston, TX (US); Samuel J. Lewis, Spring, TX (US); Thomas Pisklak, Cypress, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 6 days.

(21) Appl. No.: 16/307,349

(22) PCT Filed: Jul. 7, 2016

(86) PCT No.: PCT/US2016/041376
§ 371 (c)(1),
(2) Date: Dec. 5, 2018

(87) PCT Pub. No.: WO2018/009203
PCT Pub. Date: Jan. 11, 2018

(65) Prior Publication Data
US 2019/0241789 A1 Aug. 8, 2019

(51) Int. Cl.
*C09K 8/24* (2006.01)
*C09K 8/512* (2006.01)
*C09K 8/575* (2006.01)
*C09K 8/68* (2006.01)
*C09K 8/72* (2006.01)
*C09K 8/90* (2006.01)
*E21B 21/00* (2006.01)
*C09K 8/487* (2006.01)

(52) U.S. Cl.
CPC ............... *C09K 8/24* (2013.01); *C09K 8/512* (2013.01); *C09K 8/5756* (2013.01); *C09K 8/685* (2013.01); *C09K 8/725* (2013.01); *C09K 8/905* (2013.01); *E21B 21/003* (2013.01); *C09K 8/487* (2013.01); *C09K 2208/08* (2013.01)

(58) Field of Classification Search
None
See application file for complete search history.

(56) References Cited

U.S. PATENT DOCUMENTS

| | | | |
|---|---|---|---|
| 4,880,469 | A | 11/1989 | Chanzy et al. |
| 5,277,519 | A | 1/1994 | Nahm |
| 5,341,882 | A | 8/1994 | Hale |
| 5,361,596 | A | 11/1994 | Martin |

(Continued)

FOREIGN PATENT DOCUMENTS

| WO | 1999048831 | 11/1999 |
|---|---|---|
| WO | 2015039089 | 3/2015 |

OTHER PUBLICATIONS

International Search Report and Written Opinion for PCT/US2016/041376 dated Apr. 7, 2017.

(Continued)

*Primary Examiner* — John J Figueroa
(74) *Attorney, Agent, or Firm* — Thomas Rooney; C. Tumey Law Group PLLC

(57) ABSTRACT

A method that includes providing a treatment fluid having an aqueous base fluid and ground drilling cuttings and placing the treatment fluid in a subterranean formation.

20 Claims, 7 Drawing Sheets

(56) References Cited

U.S. PATENT DOCUMENTS

| | | | |
|---|---|---|---|
| 5,400,977 | A | 3/1995 | Hayles |
| 7,337,860 | B2 * | 3/2008 | McIntyre .............. E21B 21/065 |
| | | | 175/66 |
| 2006/0048944 | A1 | 3/2006 | Van Batentburg et al. |
| 2007/0000666 | A1 | 1/2007 | Vozniak et al. |
| 2007/0051539 | A1 | 3/2007 | Blaschike et al. |
| 2009/0095534 | A1 * | 4/2009 | Perez .................... C09K 8/524 |
| | | | 175/65 |
| 2010/0133368 | A1 * | 6/2010 | Christensen .......... E21B 21/066 |
| | | | 241/38 |
| 2013/0032409 | A1 * | 2/2013 | Livanec ................. C09K 8/524 |
| | | | 175/65 |
| 2013/0087331 | A1 | 4/2013 | Karcher et al. |
| 2014/0251614 | A1 * | 9/2014 | Muthusamy ........... C09K 8/473 |
| | | | 166/292 |
| 2016/0194555 | A1 * | 7/2016 | Malachosky ............ C09K 8/80 |
| | | | 507/269 |
| 2018/0244973 | A1 * | 8/2018 | Miller ................... E21B 21/065 |

OTHER PUBLICATIONS

"Oil Extraction from Oil-Contaminated Drill Cuttings Using a Recyclable Single-Phase O/W Microemulsion", Tenside Surfactants Detergents, 2015, vol. 52, No. 6, pp. 454-463 Huang et al.

* cited by examiner

TREATMENT FLUIDS COMPRISING RECYCLED DRILLING CUTTINGS AND METHOD OF USE

FIELD

The present invention relates generally to the treatment of drill cuttings generated during wellbore drilling operations in subterranean formations. More particularly, the present invention relates to methods of disposing of drill cuttings and/or using them within fluids and compositions useful in subterranean operations.

BACKGROUND

Drilling rigs used for the drilling of oil and gas wells typically include a supportive rig floor positioned over a well. A derrick extending vertically above the rig floor supports a traveling block which can be raised and lowered within the derrick, the traveling block supporting a tubular drill string. During drilling operations, a drill bit on the end of the drill string is conveyed into a well and is manipulated within the well via the drill pipe. The drill pipe is raised and lowered within the well utilizing the drilling rig derrick.

When installing drill pipe or other tubular pipe into a well, such pipe is typically installed in a number of sections of roughly equal length called "joints". As such pipe penetrates farther and farther into a well, additional joints of pipe must be added to the ever lengthening "string" or "drillstring" in the rig derrick. Thus, a typical drillstring comprises a plurality of sections or joints of pipe, each of which has an internal, longitudinally extending bore. During drilling operations, a drill bit along with other desired equipment is attached to the lower or distal end of said drill string.

In the most basic sense, rotary drilling operations typically involve attaching a drill bit on a lower end of a drillstring to form a drilling tool and rotating the drill bit along with the drillstring into a subterranean formation to create a well bore through which subsurface formation fluids may be recovered. In another method of drilling, coiled tubing may be used instead of jointed pipe and the drill bit may be rotated using a downhole motor.

During drilling operations, a fluid known as drilling mud or drilling fluid is normally pumped down bore of the drill pipe, and circulated up the annular space which is formed between the external surface of said drill pipe and the internal surface of the wellbore. The basic functions of drilling mud are: (1) to cool and lubricate the drill bit and downhole equipment during drilling operations; (2) to transport pieces of drilled-up rock and other debris from the bottom of the hole to the surface; (3) to suspend such rock and debris during periods when circulation is stopped; (4) to provide hydrostatic pressure to control encountered subsurface pressures; and (5) to seal the porous rock in the well with an impermeable filter cake.

As circulated drilling mud returns to the earth's surface and is pumped out of a well, the mud contains pieces of broken, drilled-up rock and other solid debris known as "cuttings" or "drill cuttings". In most cases, an effluent mud stream flowing out of a well, together with associated drill cuttings, is directed to one or more devices which are designed to separate such drill cuttings from the mud. Such devices include, but are not limited to, shale shakers, desanders, desilters, hydrocyclones and centrifuges.

Shale shakers are essentially screens that are used to separate drill cuttings from the drilling mud. In many cases, shale shakers utilize a series of screens arranged in a tiered manner relative to each other and are often made to vibrate in order to increase the quality of such separation. The bulk drilling mud passes through the screens by gravity, while the predominantly solid cuttings are inhibited from passing through and instead pass over the end of the screens. Certain shale shakers are designed to filter coarse material while other shale shakers are designed to remove finer particles from the drilling mud. Shale shakers and other similar devices are frequently necessary to efficiently separate drill cuttings from drilling mud.

Once drill cuttings and other debris have been separated from the bulk mud stream flowing out of a well, it is necessary to dispose of such cuttings. Unfortunately, the disposal of drill cuttings can present a number of different problems. Often, the most economical way to dispose of drill cuttings would simply be to discharge said cuttings directly into the surrounding environment, such as in a mud pit or discharged from an offshore platform or drill ship into the water. Even though drill cuttings leaving a shale shaker or other separation device may have been separated from a well's effluent mud stream, such cuttings nonetheless can include entrained mud and other fluids which could be damaging to the environment.

In order for drilling mud to accomplish its intended objectives, it is often necessary to control certain characteristics of such drilling mud. Chemicals and/or other additives are often mixed into such drilling muds for control of a certain parameter. Common drilling mud additives include gelling agents (e.g., colloidal solids and/or emulsified liquids), weighting materials, and other chemicals which are used to maintain mud properties within desired parameters. Although drilling mud has historically been water-based, improved results have been obtained using oil-based or synthetic-based muds, especially in severe drilling environments. Many of these additives, oil-based muds and synthetic-based muds can be environmentally harmful. Thus, it is often undesirable and a violation of environmental regulations to release such fluid-laden cuttings directly into the surrounding environment.

In order to avoid environmental contamination and comply with applicable governmental regulations, drill cuttings are frequently transported from a drilling rig to an off-site facility for disposal. In order to accomplish such off-site disposal, drill cuttings are generally loaded into boxes or other storage containers for transportation away from the rig. While this solution can be generally functional, it is not without significant problems.

One major problem associated with the off-site disposal of drill cuttings is increased cost. In most cases, special equipment is needed to move fluid-laden drill cuttings from a rig's shale shakers to another location on the rig where storage containers are loaded. Such equipment is often in the form of complicated and elaborate conveyors, augers and/or vacuum units. Moreover, large numbers of storage containers must be rented or purchased in order to accommodate such cuttings. All of this added equipment and labor increases the costs associated with the drilling process. This additional equipment can present logistical and/or safety problems on many rigs.

Another problem associated with off-site disposal of drill cuttings is environmental impact. Such off-site disposal of drill cuttings does not necessarily guarantee an overall reduction or elimination of environmental contamination. Cuttings containers must be transported to a rig, loaded with cuttings, and thereafter moved to an off-site storage facility. Trucks, vessels or other pollution-emitting means of transportation must typically be employed to transport the containers to and from the rig. As a result, the overall impact on the environment of offsite disposal can be significant.

Attempts have been made to clean drill cuttings in order to remove surface contaminants prior to discharge of such cuttings into the environment. For example, certain cuttings recovery and treatment devices utilize separate cells having low speed agitators to stir a mixture of cuttings and cleansing surfactants. The cuttings are transferred from one cell to the next where additional agitation and cleansing takes place. Thereafter, a slurry of cleansed drill cuttings and surfactant is pumped from the cells to a vibrating screen operation in which most of the surfactant is removed and recovered for later use. In some cases, a portion of the surfactant solution, which is rich in fine drill cuttings and adherent drilling fluids, is run through one or more hydrocyclone separators which discharge the fine drill cuttings in solution separated from the larger, cleansed drill cuttings.

However, attempts at washing or otherwise treating drill cuttings on location have also proven to be problematic. Frequently, existing methods of washing drill cuttings require large amounts of equipment, which can cause space problems on most drilling rigs and add to the overall expense of a drilling project. Further, such cuttings washing systems utilize surfactants or other solutions which must be disposed of or, at a minimum, kept out of the surrounding environment. Perhaps most significantly, washed drill cuttings are often not clean enough for discharge directly into the surrounding environment.

A treatment fluid may be used in a variety of subterranean operations. As used herein, the term "subterranean operation" is defined to mean any operation that requires the performance of some action or procedure below the surface of the earth, including, but not limited to, actions or procedures performed in the course of recovering oil, gas, and/or other substances from a formation below the surface of the earth. As used herein, the term "treatment," or "treating," does not imply any particular action by the fluid or any particular component thereof, but instead refers to any use related to a subterranean operation in conjunction with a desired function and/or for a desired purpose. For example, a fluid may be used to drill a well bore in a subterranean formation or to complete a well bore in a subterranean formation, as well as numerous other purposes.

Accordingly, a need exists for a means to dispose of drill cuttings in a cost-effective and environmentally sound manner.

BRIEF DESCRIPTION OF DRAWINGS

The accompanying views of the drawing are incorporated into and form a part of the specification to illustrate several aspects and examples of the present invention, wherein like reference numbers refer to like parts throughout the figures of the drawing. These figures together with the description serve to explain the general principles of the invention. The figures are only for the purpose of illustrating preferred and alternative examples of how the various aspects of the invention can be made and used and are not to be construed as limiting the invention to only the illustrated and described examples. The various advantages and features of the various aspects of the present invention will be apparent from a consideration of the drawings.

DETAILED DESCRIPTION

The present invention provides a method of disposal of drilling cuttings by utilizing them in treatment fluid compositions.

Figure 1:
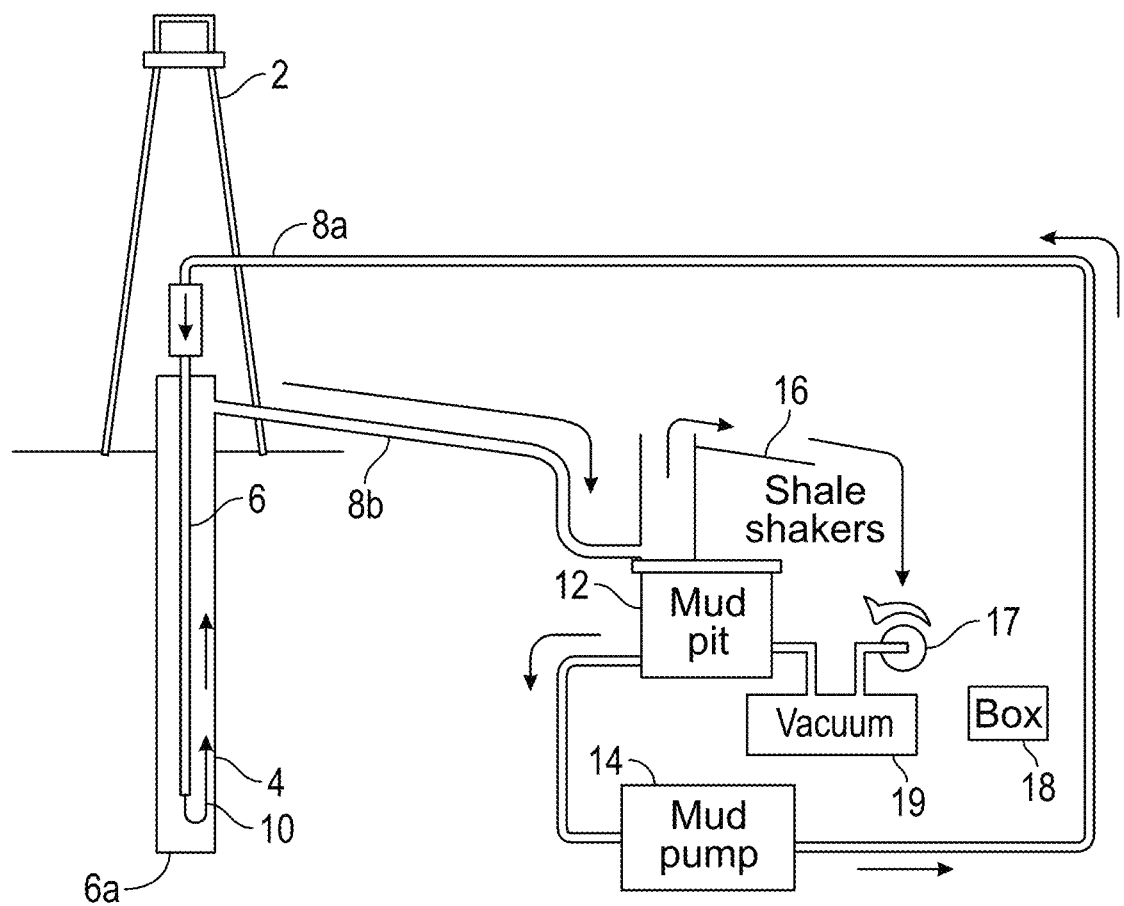
FIG. 1 is a diagram illustrating an example of a wellbore drilling mud system that may be used in accordance with certain embodiments of the present disclosure.

Referring to the drawings, FIG. 1 depicts a schematic representation of the mud system of a typical drilling rig. The flow of drilling mud within this mud system in FIG. 1 is generally in the direction of the arrows.

Still referring to FIG. 1, derrick 2 extends vertically over wellbore 4. Tubular work string 6 is inserted into wellbore 4, and extends from the earth's surface to a desired depth within the wellbore 4. Flow line 8a is connected to the tubular work string 6. Flow line 8b is connected to the annular space 10 formed between the outer surface of tubular work string 6 and the inner surface of wellbore 4.

The bulk of the drilling mud for the depicted mud system is in mud pit 12. Mud from the mud pit 12 is circulated through the overall mud system depicted schematically in FIG. 1 via mud pump 14. During typical drilling operations, mud is pumped into tubular work string 6 through flow line 8a, circulated out the bottom end 6a of work string 6, up the annulus 10 of wellbore 4, and out of the wellbore annulus 10 via flow line 8b.

During standard drilling operations, mud exiting the wellbore annulus 10 through flow line 8b often includes drill cuttings and other debris encountered in wellbore 4. Such drill cuttings are generated downhole as a result of the drilling process. Such drill cuttings and other debris would typically contaminate the overall quality of the mud system if allowed to remain in the active mud system. Accordingly, the mud and drill cuttings mixture leaving the well is directed to a separation device, such as shale shakers 16. It is to be understood that any number of separation devices could be used for this purpose; however, for purposes of illustration in FIG. 1, the separation device is depicted as being shale shakers 16. As the combined mixture of drilling mud and drill cuttings are directed over shale shakers 16, much of the "free" liquid mud passes through the screens of the shale shakers 16 and is directed into mud pit 12. Although such "free" liquids are separated at the shale shakers, the drill cuttings still frequently contain entrained and/or adherent fluids. These drill cuttings pass over shale shakers 16 and can then be discharged from the shale shakers 16 to an optional separation apparatus 17 and can then be discharged and contained in a collection box 18. The optional separation apparatus 18 can include, or work in conjunction with, a vacuum 19. Drilling fluid that is separated from the separation apparatus 17 and vacuum 19 can then be sent back to the mud pit 12 for further use.

For reasons described above, drill cuttings discharged from shale shakers 16 generally cannot simply be re-introduced into the active mud system and pumped back into a well. Accordingly, such drill cuttings must be treated and/or disposed of properly. In many cases, it is possible to collect such drill cuttings for transportation and eventual disposal. However, it is frequently beneficial to dispose or use the cuttings at the drilling rig location and avoid the transportation and offsite disposal of said cuttings.

The solutions and methods of the present invention are applicable in both newly-drilled formations and in formations requiring re-stimulation, such as with the drilling of additional lateral extensions of the wellbore. The solutions and methods of the present invention can be applicable to certain completion fluids and workover fluids such as fracturing fluids.

The exemplary methods and compositions disclosed herein may directly or indirectly affect one or more components or pieces of equipment associated with the preparation, delivery, recapture, recycling, reuse, and/or disposal of the disclosed compositions. For example, and with reference to FIG. 2, the disclosed methods and compositions may directly or indirectly affect one or more components or pieces of equipment associated with an exemplary fracturing system 20, according to one or more embodiments. In certain instances, the system 20 includes a fracturing fluid producing apparatus 25, a fluid source 30, a proppant source 40, and a pump and blender system 50 and resides at the surface at a well site where a well 60 is located. In certain instances, the fracturing fluid producing apparatus 25 combines a gel pre-cursor with fluid (e.g., liquid or substantially liquid) from fluid source 30, to produce a hydrated fracturing fluid that is used to fracture the formation. The hydrated fracturing fluid can be a fluid for ready use in a fracture stimulation treatment of the well 60 or a concentrate to which additional fluid is added prior to use in a fracture stimulation of the well 60. In other instances, the fracturing fluid producing apparatus 25 can be omitted and the fracturing fluid sourced directly from the fluid source 30. In certain instances, the fracturing fluid may comprise water, a hydrocarbon fluid, a polymer gel, foam, air, wet gases and/or other fluids.

The proppant source 40 can include a proppant for combination with the fracturing fluid. In an embodiment the proppant source 40 can include ground drilling cuttings. The system may also include additive source 70 that provides one or more additives (e.g., gelling agents, weighting agents, and/or other optional additives) to alter the properties of the fracturing fluid. For example, the other additives 70 can be included to reduce pumping friction, to reduce or eliminate the fluid's reaction to the geological formation in which the well is formed, to operate as surfactants, and/or to serve other functions.

The pump and blender system 50 receives the fracturing fluid and combines it with other components, including proppant from the proppant source 40 and/or additional fluid from the additives 70. The resulting mixture may be pumped down the well 60 under a pressure sufficient to create or enhance one or more fractures in a subterranean zone, for example, to stimulate production of fluids from the zone. Notably, in certain instances, the fracturing fluid producing apparatus 20, fluid source 30, and/or proppant source 40 may be equipped with one or more metering devices (not shown) to control the flow of fluids, proppants, and/or other compositions to the pumping and blender system 50. Such metering devices may permit the pumping and blender system 50 can source from one, some or all of the different sources at a given time, and may facilitate the preparation of fracturing fluids in accordance with the present disclosure using continuous mixing or "on-the-fly" methods. Thus, for example, the pumping and blender system 50 can provide just fracturing fluid into the well at some times, just proppants at other times, and combinations of those components at yet other times.

Figure 3:
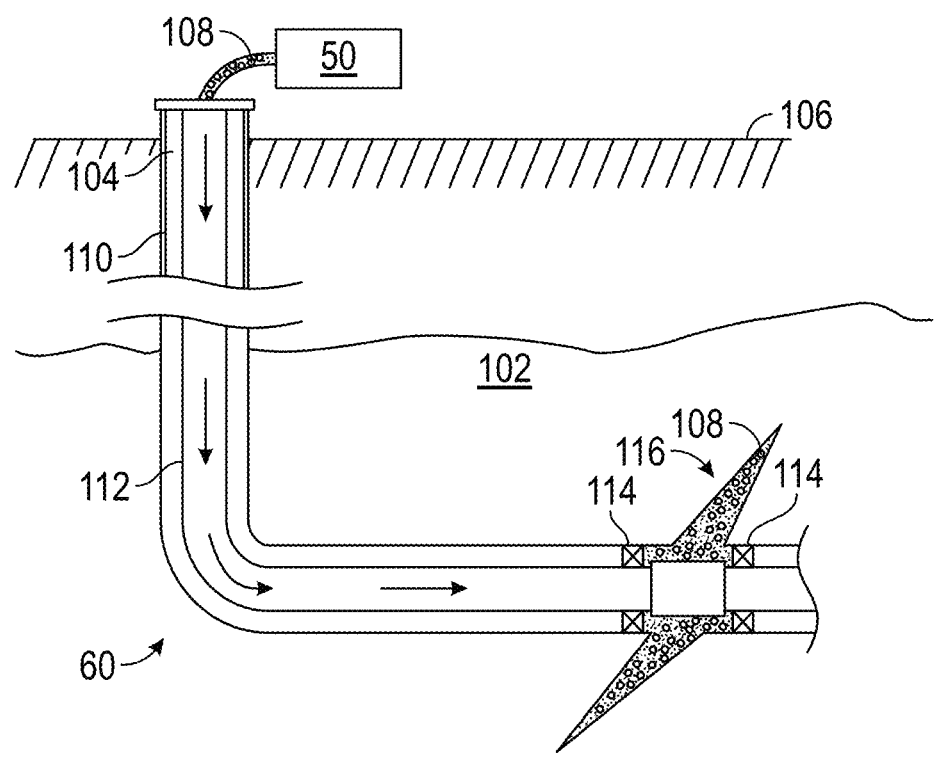
FIG. 3 is a diagram illustrating an example of a subterranean formation in which a fracturing operation may be performed in accordance with certain embodiments of the present disclosure.
Figure 4:
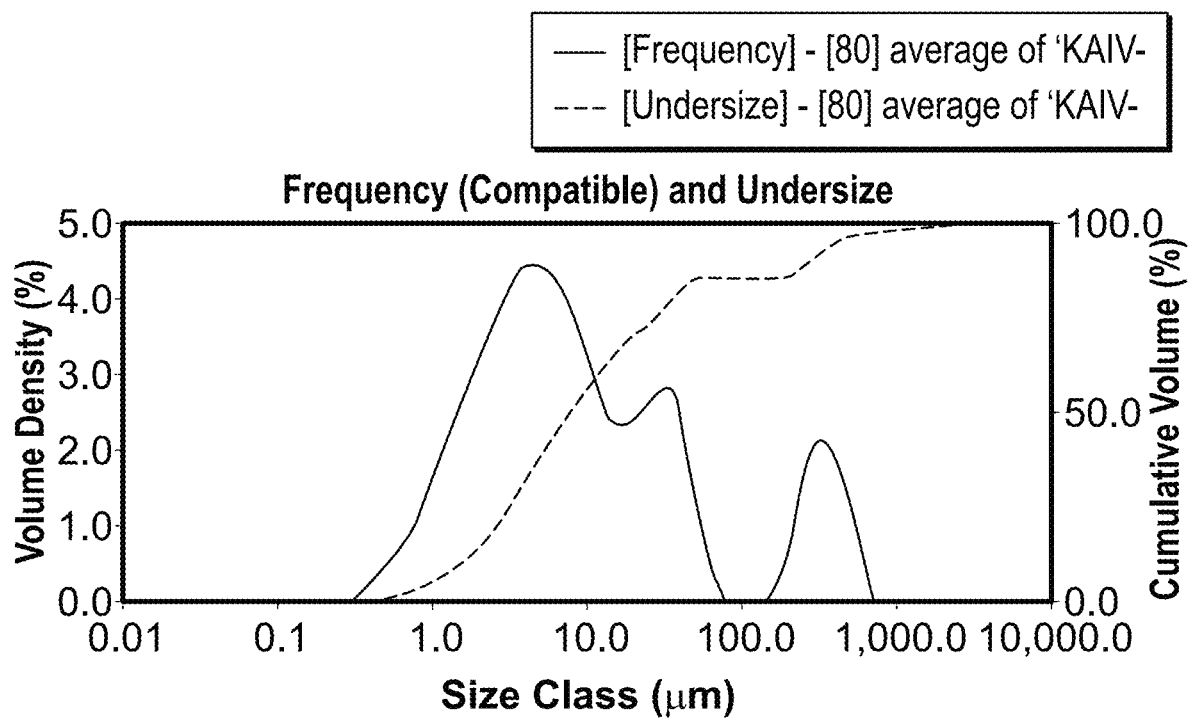
FIG. 4 is a particle size distribution curve of a drill cuttings sample.

FIG. 3 shows the well 60 during a fracturing operation in a portion of a subterranean formation of interest 102 surrounding a well bore 104. The well bore 104 extends from the surface 106, and the fracturing fluid 108 is applied to a portion of the subterranean formation 102 surrounding the horizontal portion of the well bore. Although shown as vertical deviating to horizontal, the well bore 104 may include horizontal, vertical, slant, curved, and other types of well bore geometries and orientations, and the fracturing treatment may be applied to a subterranean zone surrounding any portion of the well bore. The well bore 104 can include a casing 110 that is cemented or otherwise secured to the well bore wall. The well bore 104 can be uncased or include uncased sections. Perforations can be formed in the casing 110 to allow fracturing fluids and/or other materials to flow into the subterranean formation 102. In cased wells, perforations can be formed using shape charges, a perforating gun, hydro-jetting and/or other tools.

The well is shown with a work string 112 extending from the surface 106 into the well bore 104. The pump and blender system 50 is coupled a work string 112 to pump the fracturing fluid 108 into the well bore 104. The working string 112 may include coiled tubing, jointed pipe, and/or other structures that allow fluid to flow into the well bore 104. The working string 112 can include flow control devices, bypass valves, ports, and or other tools or well devices that control a flow of fluid from the interior of the working string 112 into the subterranean zone 102. For example, the working string 112 may include ports adjacent the well bore wall to communicate the fracturing fluid 108 directly into the subterranean formation 102, and/or the working string 112 may include ports that are spaced apart from the well bore wall to communicate the fracturing fluid 108 into an annulus in the well bore between the working string 112 and the well bore wall.

The working string 112 and/or the well bore 104 may include one or more sets of packers 114 that seal the annulus between the working string 112 and well bore 104 to define an interval of the well bore 104 into which the fracturing fluid 108 will be pumped. FIG. 3 shows two packers 114, one defining an uphole boundary of the interval and one defining the downhole end of the interval. When the fracturing fluid 108 is introduced into well bore 104 (e.g., in FIG. 2, the area of the well bore 104 between packers 114) at a sufficient hydraulic pressure, one or more fractures 116 may be created in the subterranean zone 102. The proppant particulates in the fracturing fluid 108 may enter the fractures 116 where they may remain after the fracturing fluid flows out of the well bore. These proppant particulates may "prop" fractures 116 such that fluids may flow more freely through the fractures 116.

While not specifically illustrated herein, the disclosed methods and compositions may also directly or indirectly affect any transport or delivery equipment used to convey the compositions to the fracturing system 20 such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

The present invention is a treatment fluid composition(s) comprising ground drilling cuttings. The cuttings are recovered from well drilling operations, ground into particulate material, and may be recycled through use in a number of applications. In one embodiment, the ground drilling cuttings may be incorporated into well treatment fluids, including but not limited to drilling fluids, spacers, flushes, completion fluids, fracturing fluids, and efficiency fluids. When formulated with well treatment fluids, the ground drill cuttings may serve as, for example, a weighting agent and/or scouring agent. The low cost of these ground drilling cuttings make them well suited for use in efficiency fluid systems, which take advantage of the large volumes of fluids that can be deployed on a cost per volume basis. These materials have been evaluated extensively, and results are presented herein.

In an alternate embodiment, the fluid compositions of the invention may be employed as a lost circulation management solution. The thixotropic rheological behavior of the fluid compositions containing ground drilling cuttings enable placement of the fluid compositions with significant build-up of gel strength in regions of low-shear, e.g. lost circulation zones. The fluid lost circulation management solution of the invention may be pumped through a drill bit more easily than fluids containing course fiber or granular lost circulation materials.

Base fluids suitable for use in conjunction with treatment fluids of the present invention may, in some embodiments, include, but are not limited to, oil-based fluids, aqueous-based fluids, aqueous-miscible fluids, water-in-oil emulsions, or oil-in-water emulsions.

Suitable oil-based fluids may, in some embodiments, include, but are not limited to, alkanes, olefins, aromatic organic compounds, cyclic alkanes, paraffins, diesel fluids, mineral oils, desulfurized hydrogenated kerosenes, and any combination thereof.

Suitable aqueous-based fluids may, in some embodiments, include, but are not limited to, fresh water, saltwater (e.g., water containing one or more salts dissolved therein), brine (e.g., saturated salt water), seawater, acidic aqueous fluids, basic aqueous fluids, and any combination thereof.

Suitable aqueous-miscible fluids may, in some embodiments, include, but are not limited to, alcohols (e.g., methanol, ethanol, n-propanol, isopropanol, n-butanol, sec-butanol, isobutanol, and t-butanol), glycerins, glycols (e.g., polyglycols, propylene glycol, and ethylene glycol), polyglycol amines, polyols, any derivative thereof, any in combination with salts (e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate), and any combination thereof. In some embodiments, any of the foregoing aqueous-miscible fluids or combinations thereof may be used in combination with any of the foregoing aqueous-based fluids or combinations thereof.

In some embodiments, the treatment fluids of the present invention may optionally further comprise viscosifying agents, which may be useful in adjusting the base-viscosity of the treatment fluid. The viscosifying agents suitable for use in conjunction with the present invention may comprise any substance (e.g., dispersed clays and/or polymeric materials, crosslinked or otherwise) capable of increasing the viscosity of the treatment fluid.

Suitable polymeric viscosifying agents for use in conjunction with the present invention may, in some embodiments, include, but are not limited to, polysaccharides, biopolymers, and/or derivatives thereof that contain one or more of these monosaccharide units: galactose, mannose, glucoside, glucose, xylose, arabinose, fructose, glucuronic acid, or pyranosyl sulfate. Examples of suitable polysaccharides may, in some embodiments, include, but are not limited to, guar gums (e.g., hydroxyethyl guar, hydroxypropyl guar, carboxymethyl guar, carboxymethylhydroxyethyl guar, and carboxymethylhydroxypropyl guar ("CMHPG")), cellulose derivatives (e.g., hydroxyethyl cellulose, carboxyethylcellulose, carboxymethylcellulose, and carboxymethylhydroxyethylcellulose), xanthan, scleroglucan, succinoglycan, diutan, and any combination thereof. In certain embodiments, the polymeric viscosifying agents may comprise an organic carboxylated polymer, such as CMHPG.

Suitable synthetic polymers for use in conjunction with the present invention may, in some embodiments, include, but are not limited to, 2,2'-azobis(2,4-dimethyl valeronitrile), 2,2'-azobis(2,4-dimethyl-4-methoxy valeronitrile), polymers and copolymers of acrylamide ethyltrimethyl ammonium chloride, acrylamide, acrylamido- and methacrylamido-alkyl trialkyl ammonium salts, acrylamidomethylpropane sulfonic acid, acrylamidopropyl trimethyl ammonium chloride, acrylic acid, dimethylaminoethyl methacrylamide, dimethylaminoethyl methacrylate, dimethylaminopropyl methacrylamide, dimethylaminopropylmethacrylamide, dimethyldiallylammonium chloride, dimethylethyl acrylate, fumaramide, methacrylamide, methacrylamidopropyl trimethyl ammonium chloride, methacrylamidopropyldimethyl-n-dodecyl ammonium chloride, methacrylamidopropyldimethyl-n-octylammonium chloride, methacrylamidopropyltrimethylammonium chloride, methacryloylalkyl trialkyl ammonium salts, methacryloylethyl trimethyl ammonium chloride, methacrylylamidopropyldimethylcetylammonium chloride, N-(3-sulfopropyl)-N-methacrylamidopropyl-N,N-dimethyl ammonium betaine, N,N-dimethylacrylamide, N-methylacrylamide, nonylphenoxypoly(ethyleneoxy)ethylmethacrylate, partially hydrolyzed polyacrylamide, poly 2-amino-2-methyl propane sulfonic acid, polyvinyl alcohol, sodium 2-acrylamido-2-methylpropane sulfonate, quaternized dimethylaminoethylacrylate, quaternized dimethylaminoethylmethacrylate, and derivatives and combinations thereof. In certain embodiments, the polymeric viscosifying agent comprises an acrylamide/2-(methacryloyloxy) ethyltrimethylammonium methyl sulfate copolymer. In certain embodiments, the polymeric viscosifying agent may comprise an acrylamide/2-(methacryloyloxy)ethyltrimethylammonium chloride copolymer. In certain embodiments, the polymeric viscosifying agent may comprise a derivatized cellulose that comprises cellulose grafted with an allyl or a vinyl monomer.

Additionally, polymers and copolymers that comprise one or more functional groups (e.g., hydroxyl, cis-hydroxyl, carboxylic acids, derivatives of carboxylic acids, sulfate, sulfonate, phosphate, phosphonate, amino, or amide groups) may be used as polymeric viscosifying agents.

The crosslinking agents suitable for use in conjunction with the present invention may, in some embodiments, include, but are not limited to, a borate ion, a metal ion, or similar component that is capable of crosslinking at least two molecules of a polymeric viscosifying agent. Examples of suitable crosslinking agents may, in some embodiments, include, but are not limited to, borate ions, magnesium ions, zirconium IV ions, titanium IV ions, aluminum ions, antimony ions, chromium ions, iron ions, copper ions, magnesium ions, and zinc ions. These ions may, in some embodiments, be provided by providing any compound that is capable of producing one or more of these ions. Examples of such compounds may include, but are not limited to, ferric chloride, boric acid, disodium octaborate tetrahydrate, sodium diborate, pentaborates, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, and titanium acetylacetonate, aluminum lactate, aluminum citrate, antimony compounds, chromium compounds, iron compounds, copper compounds, zinc compounds, and combinations thereof.

In some embodiments, suitable combinations of any of the aforementioned polymeric viscosifying agents and/or crosslinking agents may be utilized.

Viscosifying agents may be present in the treatment fluids described herein in an amount sufficient to provide the desired viscosity. In some embodiments, the viscosifying agents may be present in an amount ranging from a lower limit of about 0.1%, 0.15%, or 1% by weight of the treatment fluid to an upper limit of about 10%, 5%, or 2.5% by weight of the treatment fluid, and wherein the amount may range from any lower limit to any upper limit and encompass any subset there between. In some embodiments, the crosslinking agents may be present in an amount ranging from a lower limit of about 0.005%, 0.01%, or 0.05% by weight of the treatment fluid to an upper limit of about 1%, 0.5%, or 0.1% by weight of the treatment fluid, and wherein the amount may range from any lower limit to any upper limit and encompass any subset in between.

In some embodiments, the treatment fluids of the present invention may optionally further comprise particulates (e.g., weighting agents, lost circulation materials, and any combination thereof). Particulates suitable for use in conjunction with the present invention may comprise any material suitable for use in subterranean operations. It should be understood that the term "particulate," as used in this disclosure, includes all known shapes of materials, including substantially spherical materials, fibrous materials, polygonal materials (such as cubic materials), and combinations thereof. Moreover, fibrous materials, that may or may not be used to bear the pressure of a closed fracture, may be included in certain embodiments of the present invention.

In some embodiments, particulates may comprise a material that may, in some embodiments, include, but are not limited to, sand, bauxite, ceramic materials, glass materials, polymer materials, polytetrafluoroethylene materials, cured resinous particulates, nut shell pieces, seed shell pieces, fruit pit pieces, wood, composite particulates, and combinations thereof. Suitable composite particulates may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, fibers of cellulose (e.g., including viscose cellulosic fibers, oil coated cellulosic fibers, and fibers derived from a plant product like paper fibers), carbon including carbon fibers, melt-processed inorganic fibers (e.g., basalt fibers, woolastonite fibers, non-amorphous metallic fibers, metal oxide fibers, mixed metal oxide fibers, ceramic fibers, and glass fibers), polymeric fibers (e.g., polypropylene fibers and poly(acrylic nitrile) fibers), metal oxide fibers, mixed metal oxide fibers, and the like, and any combination thereof. One skilled in the art with the benefit of this disclosure should recognize that the materials of the particle should be chosen based on the application of the particle.

In some embodiments, weighting agents may include, but are not limited to, barite, precipitated barite, submicron precipitated barite, hematite, ilmentite, manganese tetraoxide, galena, calcium carbonate, and any combination thereof.

In some embodiments, the particulates described herein may be present in the treatment fluids of the present invention in an amount ranging from a lower limit of about 0.5 pounds per gallon ("ppg"), 1 ppg, or 5 ppg of the treatment fluid to an upper limit of about 30 ppg, 25 ppg, 20 ppg, or 10 ppg of the treatment fluid, and wherein the amount may range from any lower limit to any upper limit and encompass any subset in between.

Increasing the viscosity and/or apparent density of the treatment fluid may be particularly useful in wellbore operations where the treatment fluid comprises particulates, e.g., to mitigate particulate settling and/or to increase the carrying or transport capacity for particulates in the treatment fluid. In some embodiments, the viscosity and/or apparent density of the treatment fluid may be adjusted to inhibit settling of particulates from a treatment fluid, e.g., during drilling operations or proppant placement operations. In some embodiments, the viscosity and/or apparent density of the treatment fluid may be adjusted to increase the carrying or transport capacity for particulates in the treatment fluid, e.g., during drilling operations or proppant placement operations. In some embodiments, the inhibition of particulate settling and/or increased particulate carrying capacity may be localized where a magnetic field is applied, which may be advantageous in zones within a wellbore that may be susceptible to particulate settling, e.g., high-temperature zones where shear thinning may be prevalent.

As illustrated in the present disclosure, treatment fluids described herein may be utilized in a plurality of subterranean operations. Examples of suitable subterranean operations that can utilize the treatment fluids described herein may include, but are not limited to, drilling operations, lost circulation operations, stimulation operations, sand control operations, completion operations, cementing operations, acidizing operations, scale inhibiting operations, water-blocking operations, clay stabilizer operations, fracturing operations, frac-packing operations, gravel packing operations, wellbore strengthening operations, and sag control operations. The methods and compositions of the present invention may be used in full-scale operations or pills. As used herein, a "pill" is a type of relatively small volume of specially prepared treatment fluid placed or circulated in the wellbore.

In some embodiment, the treatment fluids of the present invention may be foamed. As used herein the term foam refers to a two-phase composition having a continuous liquid phase and a discontinuous gas phase. In some embodiments, the treatment fluids of the present invention may comprise a base fluid, drilling cuttings, a gas, and optionally a foaming agent.

Suitable gases for use in conjunction with the present invention may include, but are not limited to, nitrogen, carbon dioxide, air, methane, helium, argon, and any combination thereof. One skilled in the art, with the benefit of this disclosure, should understand the benefit of each gas. By way of nonlimiting example, carbon dioxide foams may have deeper well capability than nitrogen foams because carbon dioxide emulsions have greater density than nitrogen gas foams so that the surface pumping pressure required to reach a corresponding depth is lower with carbon dioxide than with nitrogen. Moreover, the higher density may impart greater proppant transport capability, up to about 12 lb of proppant per gal of fracture fluid.

In some embodiments, the quality of a foamed treatment fluid of the present invention may range from a lower limit of about 5%, 10%, 25%, 40%, 50%, 60%, or 70% gas volume to an upper limit of about 95%, 90%, 80%, 75%, 60%, or 50% gas volume, and wherein the quality of the foamed treatment fluid may range from any lower limit to any upper limit and encompass any subset there between. The foamed treatment fluid may, in some embodiments, have a foam quality from about 85% to about 95%, or about 90% to about 95%.

Foaming agents suitable for use in conjunction with the present invention may, in some embodiments, include, but are not limited to, cationic foaming agents, anionic foaming agents, amphoteric foaming agents, nonionic foaming agents, or any combination thereof. Nonlimiting examples of suitable foaming agents may, in some embodiments, include, but are not limited to, surfactants like betaines, sulfated or sulfonated alkoxylates, alkyl quaternary amines, alkoxylated linear alcohols, alkyl sulfonates, alkyl aryl sulfonates, $C_{10}$-$C_{20}$ alkyldiphenyl ether sulfonates, polyethylene glycols, ethers of alkylated phenol, sodium dodecylsulfate, alpha olefin sulfonates such as sodium dodecane sulfonate, trimethyl hexadecyl ammonium bromide, and the like, any derivative thereof, or any combination thereof. Foaming agents may, in some embodiments, be included in foamed treatment fluids at concentrations ranging typically from about 0.05% to about 2% of the liquid component by weight (e.g., from about 0.5 to about 20 gallons per 1000 gallons of liquid). In some embodiments, a foaming agent used in conjunction with a foamed treatment fluid may comprise magnetic surfactants described herein.

Samples of drilling cuttings were obtained, ground and analyzed.

Chemical Composition

Compositional oxide analysis indicates that the ground drill cuttings that were studied consist mostly of silica and calcium containing species. Also, detected in notable quantities are oxides of barium, aluminum, iron, and sulfur. The sample cuttings were found to contain low quantities of sodium and magnesium oxides. The Loss on Ignition (LOI) determination measured 12.52% residual carbon containing material. This likely is derived from the organic solvents/carrier fluids, e.g. diesel, kerosene, from drilling fluids employed in the drilling operations. Rietveld XRD analysis identifies quartz as the major crystalline phase present, along with, in decreasing wt %, corundum, calcite, barite, and feldspar. Trace amounts of clays, ilite and kaolinite, were also identified.

Oxide Analysis

TABLE 1

Tabulated results from XRF oxide analysis.

| Compound | m/m % | StdErr |
|---|---|---|
| SiO2 | 38.7 | 0.49 |
| CaO | 21.5 | 0.21 |
| BaO | 13.29 | 0.38 |
| Al2O3 | 11.2 | 0.54 |
| Fe2O3 | 8.15 | 0.15 |
| SO3 | 3.98 | 0.23 |
| K2O | 0.986 | 0.079 |
| SrO | 0.657 | 0.033 |
| Cr2O3 | 0.467 | 0.035 |
| Cl | 0.442 | 0.043 |
| NiO | 0.204 | 0.012 |
| MnO | 0.155 | 0.018 |
| Co3O4 | 0.089 | 0.033 |
| ZrO2 | 0.085 | 0.018 |
| ZnO | 0.05 | 0.0026 |
| CuO | 0.0111 | 0.0024 |
| MoO3 | 0.0097 | 0.0024 |
| Rb2O | 0.009 | 0.002 |

ICP Measurement on $Na_2O$ and MgO $Na_2O$=0.292%
MgO=0.643%

LOI Determination

The sample was moist, and hence it was dried at 105° C. overnight prior to LOI analysis. The sample has 5.65% moisture content and the LOI is 12.52%.

X-Ray Diffraction Analysis by the Rietveld Full-Pattern Refinement

The sample is primarily composed of quartz, barite, calcite, corundum ($Al_2O_3$), feldspar and trace amount of clays (ilite, kaolinite), as shown in Table 2.

TABLE 2

| Sample | Quartz (wt. %) | Barite (wt. %) | Corundum (wt. %) | Feldspar (wt. %) | Calcite (wt. %) | Portlandite (wt. %) |
|---|---|---|---|---|---|---|
| Sample A | 43 | 13 | 19 | 7 | 17 | 1 |

Physical Properties

Particle size analysis of ground drill cutting samples was performed which indicate a trimodal distribution with volume density maxima at approximately 4.5, 25, and 350 μm. The D10, 50, and 90 measurements are 1.44, 6.79, 259 μM, respectively. Microscopy reveals that the ground drill cuttings are roughly particulate in shape, with little to no aspect ratio. In agreement with the particle size analysis, a wide range of particle sizes were observed. The larger particles were determined to be quartz and corundum, and were found to be coated with smaller-sized particles of barite and calcite. Specific gravity was measured by pycnometer at 2.6, less than that of Portland cement but greater than that of pozzolan pumice and fly ash type F, and roughly equivalent to 100 mesh silica sand which is a known strength stabilizing agent, for comparison.

Particle Size Distribution Analysis

Figure 2:
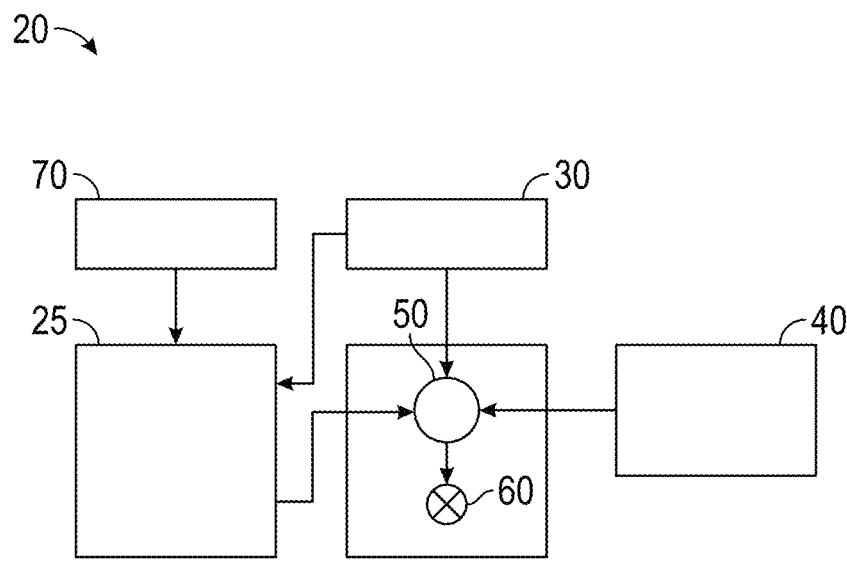
FIG. 2 is a diagram illustrating an example of a fracturing system that may be used in accordance with certain embodiments of the present disclosure.

The sample has a PSD curve of three peaks as shown in Table 3 and in the PSD curve shown in FIG. 2.

TABLE 3

| Sample # | D10 (μm) | D50 (μm) | D90 (μm) |
|---|---|---|---|
| Sample A | 1.44 | 6.79 | 259 |

SEM & EDS-XRF

Figure 5:
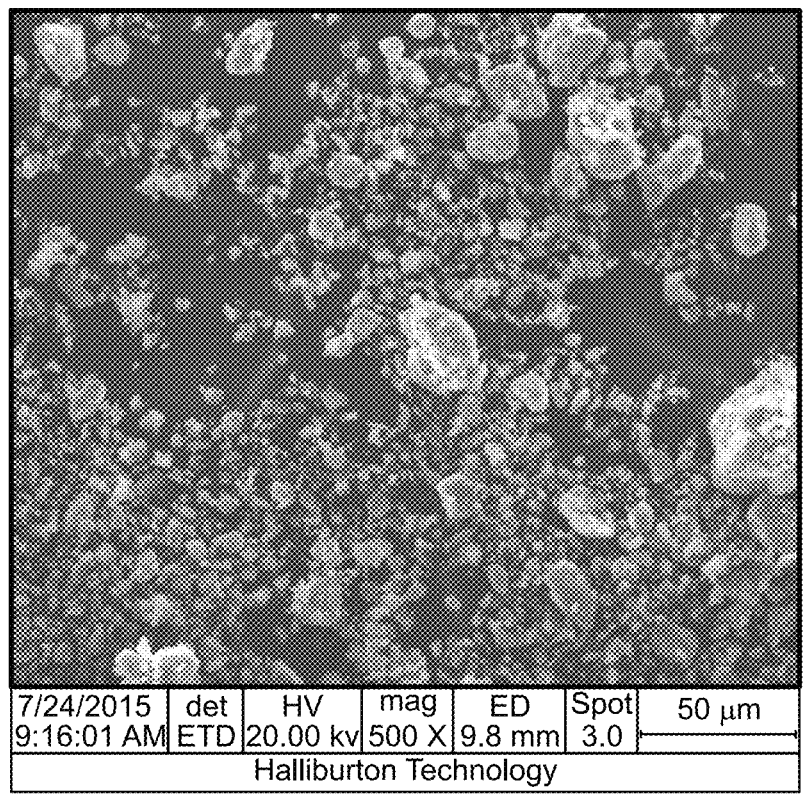
FIG. 5 is an image of a drill cuttings sample imaged at 500× magnification.
Figure 6:
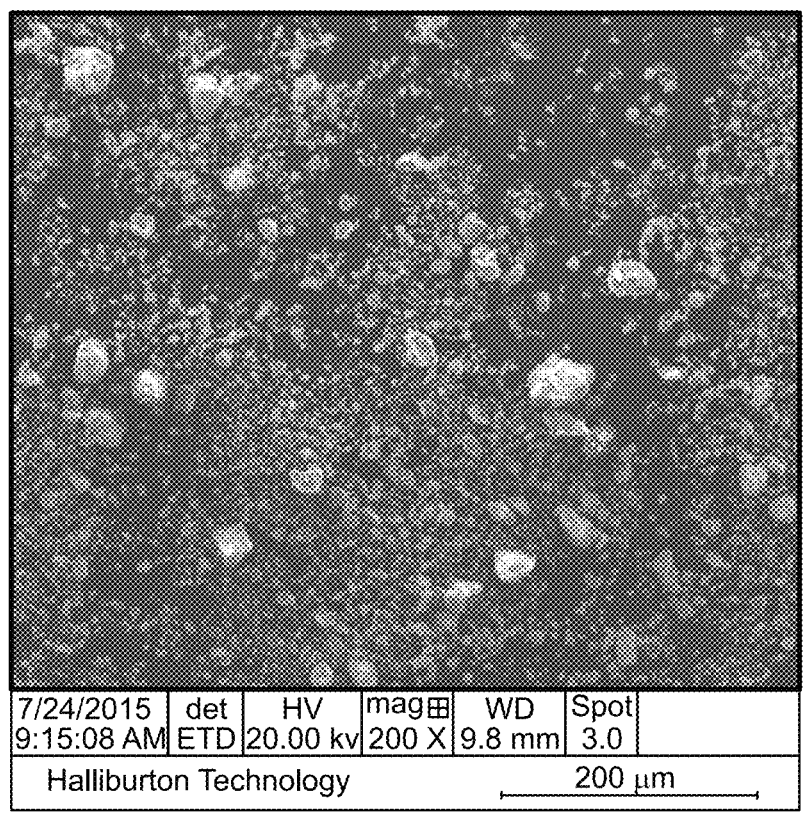
FIG. 6 is an image of a drill cuttings sample imaged at 200× magnification.
Figure 7:
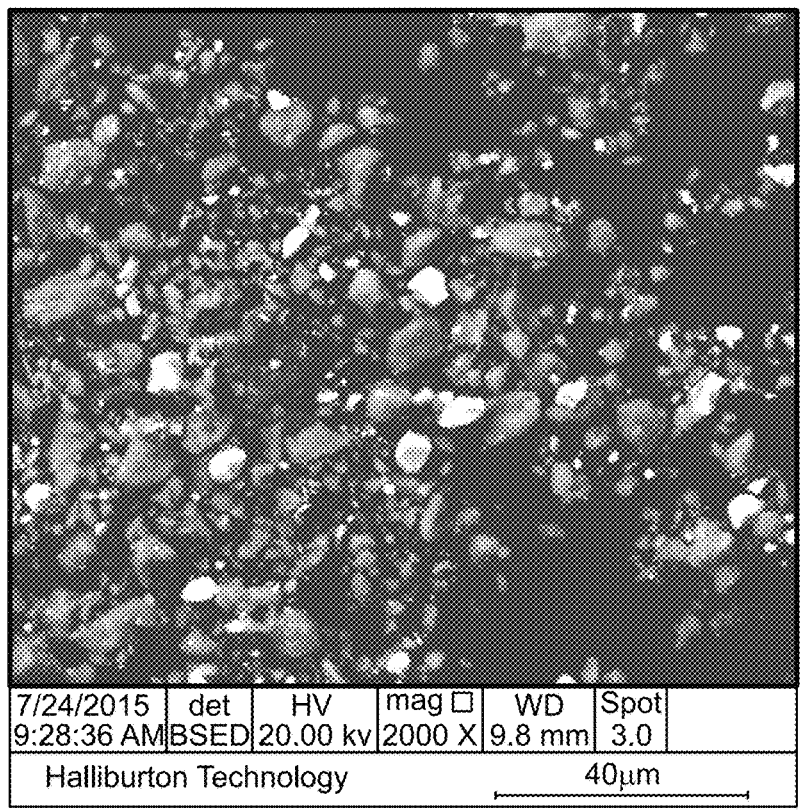
FIG. 7 is an image of a drill cuttings sample imaged at 2,000× magnification.
Figure 8:
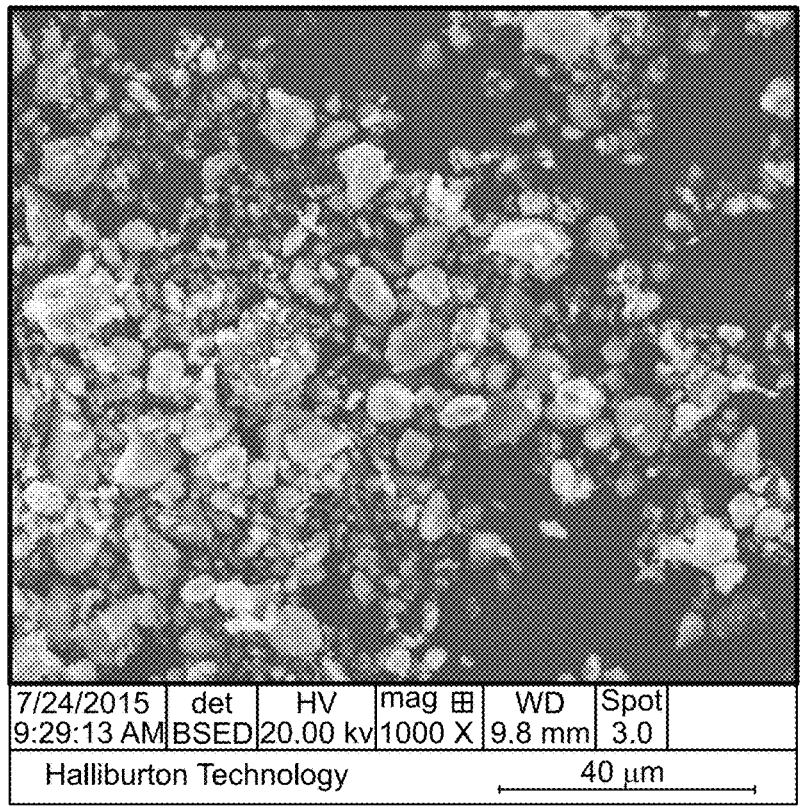
FIG. 8 is an image of a drill cuttings sample imaged at 1,000× magnification.
Figure 9:
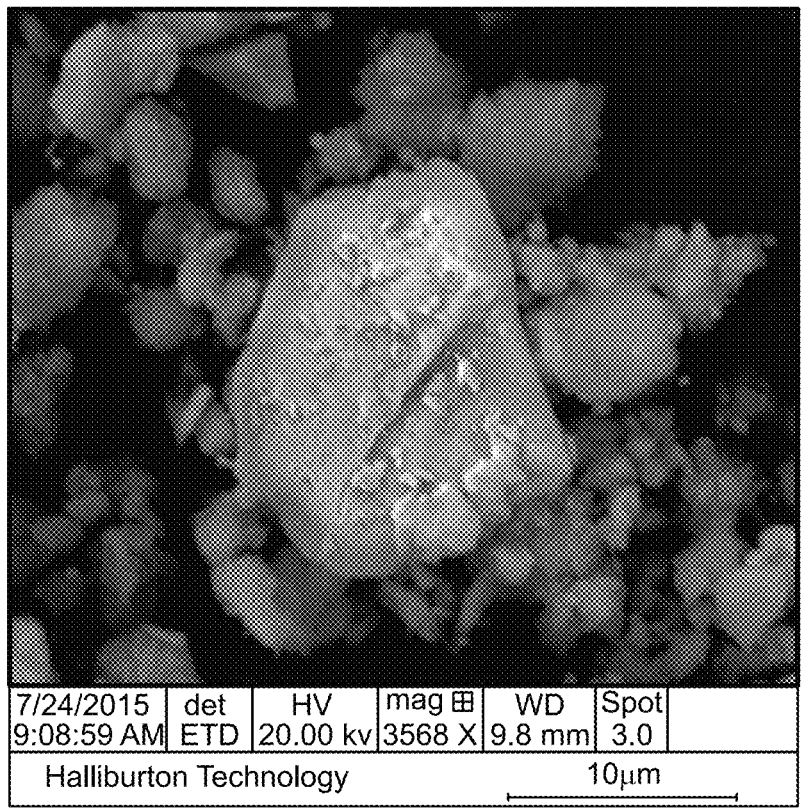
FIG. 9 is an image of a drill cuttings sample imaged at 3,568× magnification.
Figure 10:
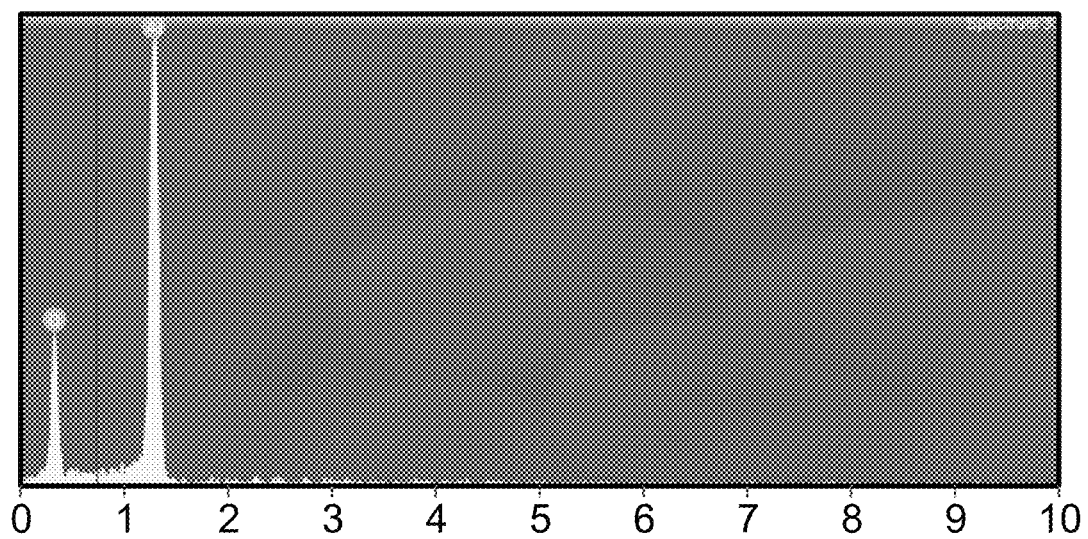
FIG. 10 is a graph of energy dispersive spectra of drilling cuttings sample containing Corundum.

Particles of ground drilling cuttings are shown to have various sizes. Some particles are less than 1 micron. The majority of large particles are quartz, corundum coated/surround with small particles (barite, calcite). Ground drilling cuttings imaged at 500× magnification is shown in FIG. 5, whereas ground drilling cuttings imaged at 200× magnification is shown in FIG. 6. Ground drilling cuttings imaged at 2000× magnification is shown in FIG. 7, whereas ground drilling cuttings imaged at 1000× magnification is shown in FIG. 8. Drilling cuttings sample imaged at 3568× magnification is shown in FIG. 9.

Specific Gravity Measurements

Specific gravity measurements by Pycnometer of Drilling Cuttings and other common fillers, cements, and pozzolans for comparison are shown in Table 4.

TABLE 4

| Material | SG |
|---|---|
| Drill Cuttings | 2.62 |
| Portland Cement Class H | 3.15 |
| Fly Ash F | 2.5 |
| Pumice | 2.4 |
| Silica Sand 100 mesh | 2.63 |

Evaluation for Cementitious Properties

The ground drill cuttings of the present invention were evaluated for cementitious properties. Samples of ground drill cuttings were mixed with water (I, II III), water and lime (IV, V) and water and lime with sodium hydroxide (VI, VII), and the test slurries cured at 180° F. in a water bath at ambient pressure. Sample formulations for I-VVI are provided below in Table 5. None of the test formulations containing ground drill cuttings, not even those containing lime and sodium hydroxide, set under the test conditions. Sample VI was consolidated enough after curing 24 hours to give 34.6 psi compressive strength as measured on the TO load frame; however, this is insignificant and all other samples tested did not set in as much as 48 hours curing. These results provide support for the ground drill cuttings to be formulated into treatment fluid compositions without running the risk of the treatment fluids undesirably setting up or consolidating, even under strongly alkaline conditions.

TABLE 5

| | I | | II | | III | | IV | | V | | VI | | VII | |
|---|---|---|---|---|---|---|---|---|---|---|---|---|---|---|
| | g | Amt (% bwoDC) | g | Amt (% bwoDC) | g | Amt (% bwoDC) | g | Amt (% bwoDC) | g | Amt (% bwoDC) | g | Amt (% bwoDC) | g | Amt (% bwoDC) |
| Drill Cuttings (DC) | 300 | 100 | 300 | 100 | 150 | 100 | 160 | 100 | 120 | 100 | 120 | 100 | 120 | 100 |
| Lime | — | — | — | — | — | — | 40 | 25 | 30 | 25 | 30 | 25 | 30 | 25 |
| Water | 150 | 50 | 225 | 75 | 150 | 100 | 150 | 94 | 150 | 125 | 113 | 94 | 150 | 125 |
| NaOH | — | — | — | — | — | — | — | — | — | — | 6 | 5 | 6 | 5 |
| Mixability | 1 | | 3 | | 5 | | 2 | | 5 | | 2 | | 4 | |
| 24 h CS (psi) @180 F., amb | DNS | | DNS | | DNS | | DNS | | DNS | | 34.6 | | DNS | |
| 48 h CS (psi) @180 F., amb | — | | DNS | | DNS | | DNS | | DNS | | — | | — | |

Mixablity (0-5), 0 is not mixable
DNS = Did Not Set

Fluid Stability & Rheology

Stability of a fluid composition containing drilling cuttings was investigated. The table below provides the formulation of a water-based drilling cutting suspension, which simulates a treatment fluid composition. The formulation contains a suspending agent and an emulsifier.

TABLE 6

Formulation of simulated treatment fluid containing drilling cuttings.

| Drill Cuttings | 350 g | 40.7% bw |
|---|---|---|
| Suspending Agent | 1.5 g | 0.2% bw |
| Emulsifier | 8.5 g | 1.0% bw |
| Water | 500 g | 58.1% bw |
| Total | 860 g | 100.0 |

An API free fluid test on the sample formulation showed no separation of water or non-homogeneity throughout the fluid column after 2 static hours (250 mL graduated cylinder).

Figure 11:
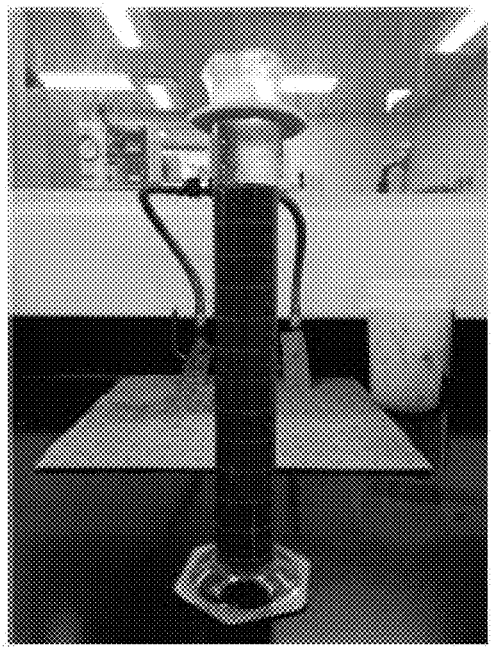
FIG. 11 is an image of a drilling cuttings containing treatment fluid composition after 2 h API free fluid test.
Figure 12:
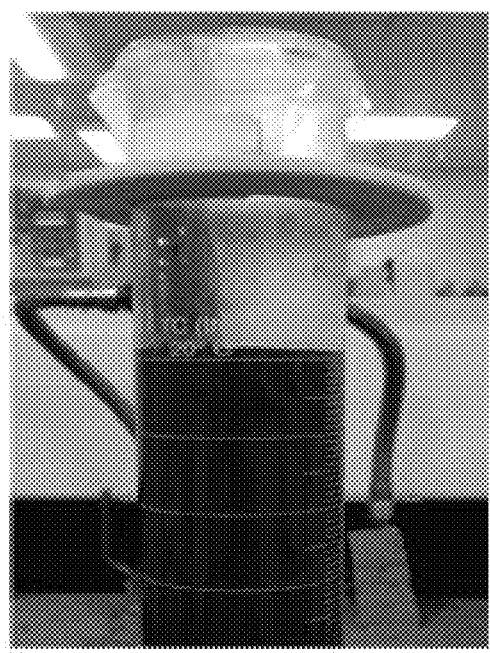
FIG. 12 is an image of a drilling cuttings containing treatment fluid composition after 2 h API free fluid test.

Rheology measurements of the test fluid composition were taken using a FYSA adapter on a Fann 35 Rotational Viscometer. Also, 10 sec, 1 min, and 10 min gel strengths were determined through API calculation. The viscometer is shown in FIGS. 11 and 12.

TABLE 6

FYSA rheology measurement readings and gel strength calculations for drilling cuttings containing treatment fluid composition

| RPM | 3 | 6 | 100 | 200 | 300 | 6D | 3D |
|---|---|---|---|---|---|---|---|
| RD up | 21 | 20 | 26 | 30 | 33 | 17.5 | 17.5 |
| RD dn | 20 | 20 | 26 | 30 | 34 | | |
| RD ave | 20.5 | 20 | 26 | 30 | 33.5 | | |

TABLE 7

FYSA rheology measurement readings and gel strength calculations for drilling cuttings-containing treatment fluid composition.

| | 10 s | 1 min | 10 min |
|---|---|---|---|
| RD, Θ | 29 | 32 | 32 |
| τ(Pa) | 14.787 | 16.317 | 16.317 |
| τ(lb/100 ft$^2$) | 30.806 | 33.994 | 33.994 |

τ(Pa) = 0.5099 × F × Θ, where F = 1 (API RP 10B-2)
τ(lb/100 ft$^2$) = τ(Pa)/0.48

The rheology and static gel strength measurements for the compositions of the invention suggest thixotropic behavior, and potential for application as a lost circulation management (LCM) fluid. The low shear FYSA readings (average of 20.5 and 20 for 3 and 6 RPM, respectively), dynamic gel strength readings (17.5 for both 6 and 3 RPM decay), and static gel strength measurements (31, 34, and 34 lb/100 ft$^2$ for 10 s, 1 min, and 10 min, respectively) are relatively high. As shear is increased up to 300 RPM the FYSA readings increase only up to average 33.5. The fluid compositions of the invention can serve as a fluid LCM solution owing to its ability to rapidly build gel strength in low shear environments.

An embodiment of the present invention is a method that involves providing a treatment fluid that contains an aqueous base fluid along with ground drilling cuttings and placing the treatment fluid in a subterranean formation. The treatment fluid can be selected from drilling fluids, spacers, flushes, and efficiency fluids. In an embodiment the treatment fluid is a lost circulation management solution. The ground drilling cuttings can provide the treatment fluid a thixotropic rheological behavior which can provide significant build-up of gel strength in regions of the subterranean formation having low-shear or alternately regions of the subterranean formation having lost circulation zones. In optional embodiments the ground drill cuttings serve as a weighting agent, scouring agent or as a lost circulation control agent. The embodiment can include the mixing of the treatment fluid using mixing equipment and can also include introducing the treatment fluid into a subterranean formation using one or more pumps.

In an embodiment the ground drill cuttings can have a volume density maxima of 350 mm. In an embodiment the base fluid can be oil-based fluids, aqueous-based fluids, aqueous-miscible fluids, water-in-oil emulsions or oil-in-water emulsions.

In an embodiment the treatment fluid further includes a viscosifying agent. The viscosifying agent can be selected from polysaccharides, biopolymers, and/or derivatives thereof that contain one or more of these monosaccharide units: galactose, mannose, glucoside, glucose, xylose, arabinose, fructose, glucuronic acid and pyranosyl sulfate.

In an embodiment the treatment fluid further includes a crosslinking agent. The crosslinking agent can be selected from a borate ion or a metal ion. The crosslinking agent can be capable of crosslinking at least two molecules of a polymeric viscosifying agent.

In an embodiment the invention further includes performing a subterranean operation which can be: drilling operations, lost circulation management operations, stimulation operations, sand control operations, completion operations, acidizing operations, scale inhibiting operations, water-blocking operations, clay stabilizer operations, fracturing operations, frac-packing operations, gravel packing operations, wellbore strengthening operations, sag control operations and the like or combinations thereof.

An embodiment of the present disclosure is a method that includes providing a treatment fluid selected from the group comprising drilling fluids, spacers, flushes, and efficiency fluids, the treatment fluid comprising an aqueous base fluid and ground drilling cuttings and placing the treatment fluid in a subterranean formation wherein the ground drilling cuttings provides the treatment fluid a thixotropic rheological behavior that provides significant build-up of gel strength in regions of the subterranean formation having low-shear. The embodiment can include the mixing of the treatment fluid using mixing equipment and can also include introducing the treatment fluid into a subterranean formation using one or more pumps.

An embodiment of the present disclosure is a method that includes providing a lost circulation treatment fluid comprising an aqueous base fluid and ground drilling cuttings and placing the treatment fluid in a subterranean formation wherein the treatment fluid is a lost circulation management solution and wherein the thixotropic rheological behavior of the treatment fluid provides significant build-up of gel strength in regions of the subterranean formation having lost circulation zones.

An embodiment of the present disclosure is a lost circulation treatment fluid that includes an aqueous base fluid and ground drilling cuttings wherein thixotropic rheological behavior of the treatment fluid provides significant build-up of gel strength in regions of a subterranean formation having lost circulation zones. The lost circulation treatment fluid can further include at least one lost circulation material additive which can be a granular material, flake material or fibrous material. The lost circulation material additive can be selected from the group consisting of: sand, bauxite, ceramic materials, glass materials, polymer materials, polytetrafluoroethylene materials, cured resinous particulates, nut shell pieces, seed shell pieces, fruit pit pieces, wood fibers, composite particulates, fibers of cellulose, carbon fibers, melt-processed inorganic fibers, polymeric fibers, metal oxide fibers or mixed metal oxide fibers.

These and other aspects of the invention will be apparent to one skilled in the art upon reading the following detailed description. While the invention is susceptible to various modifications and alternative forms, specific embodiments thereof will be described in detail and shown by way of example. It should be understood, however, that it is not intended to limit the invention to the particular forms disclosed, but, on the contrary, the invention is to cover all modifications and alternatives falling within the scope of the invention as expressed in the appended claims. The compositions can comprise, consist essentially of, or consist of the stated materials. The method can comprise, consist essentially of, or consist of the stated steps with the stated materials.

The various embodiments of the present invention can be joined in combination with other embodiments of the invention and the listed embodiments herein are not meant to limit the invention. All combinations of various embodiments of the invention are enabled, even if not given in a particular example herein.

While illustrative embodiments have been depicted and described, modifications thereof can be made by one skilled in the art without departing from the scope of the disclosure. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Moreover, the indefinite articles "a" or "an", as used in the claims, are defined herein to mean one or more than one of the element that it introduces. If there is any conflict in the usages of a word or term in this specification and one or more patent or other documents, the definitions that are consistent with this specification should be adopted. While compositions and methods are described in terms of "comprising," "containing," or "including" various components or steps, the compositions and methods can also "consist essentially of or" consist of the various components and steps. Also, the terms in the claims have their plain, ordinary meaning unless otherwise explicitly and clearly defined by the patentee.

Depending on the context, all references herein to the "invention" may in some cases refer to certain specific embodiments only. In other cases it may refer to subject matter recited in one or more, but not necessarily all, of the claims. While the foregoing is directed to embodiments, versions and examples of the present invention, which are included to enable a person of ordinary skill in the art to make and use the inventions when the information in this patent is combined with available information and technology, the inventions are not limited to only these particular embodiments, versions and examples.

Numerous other modifications, equivalents, and alternatives, will become apparent to those skilled in the art once the above disclosure is fully appreciated. While embodiments of the invention have been shown and described, modifications thereof can be made by one skilled in the art without departing from the teachings of this disclosure. The embodiments described herein are exemplary only, and are not intended to be limiting. Many variations and modifications of the invention disclosed herein are possible and are within the scope of the invention.

Use of the term "optionally" with respect to any element of a claim is intended to mean that the subject element is required, or alternatively, is not required. Both alternatives are intended to be within the scope of the claim. It is intended that the following claims be interpreted to embrace all such modifications, equivalents, and alternatives where applicable. Other and further embodiments, versions and examples of the invention may be devised without departing from the basic scope thereof and the scope thereof is determined by the claims that follow.

The invention claimed is:

1. A method comprising:
   providing a treatment fluid that comprises:
      an aqueous base fluid,
      ground drilling cuttings; and
      a crosslinking agent selected from the group consisting of a borate ion, a metal ion and combinations thereof; and
   placing the treatment fluid in a subterranean formation.

2. The method of claim 1, wherein the treatment fluid is selected from the group comprising drilling fluids, spacers, flushes, and efficiency fluids.

3. The method of claim 1, wherein the treatment fluid is a lost circulation management solution.

4. The method of claim 1, wherein the ground drilling cuttings provides the treatment fluid a thixotropic rheological behavior.

5. The method of claim 4, wherein the thixotropic rheological behavior of the treatment fluid provides significant build-up of gel strength in regions of the subterranean formation having low-shear.

6. The method of claim 4, wherein the thixotropic rheological behavior of the treatment fluid provides significant build-up of gel strength in regions of the subterranean formation having lost circulation zones.

7. The method of claim 1, wherein the ground drill cuttings serve as at least one of a weighting agent, a scouring agent, or a lost circulation control agent.

8. The method of claim 1, wherein the ground drill cuttings have a volume density maxima of 350 µm.

9. The method of claim 1, wherein base fluid is selected from the group comprising: oil-based fluids, aqueous-based fluids, aqueous-miscible fluids, water-in-oil emulsions, and oil-in-water emulsions.

10. The method of claim 1, wherein the treatment fluid further comprises a viscosifying agent selected from the group consisting of: polysaccharides, biopolymers, and/or derivatives thereof that contain one or more of these monosaccharide units: galactose, mannose, glucoside, glucose, xylose, arabinose, fructose, glucuronic acid, pyranosyl sulfate, and combinations thereof.

11. The method of claim 1, wherein the crosslinking agent is capable of crosslinking at least two molecules of a polymeric viscosifying agent.

12. The method of claim 1, further comprising performing a subterranean operation selected from the group consisting of a drilling operation, a lost circulation management operation, a stimulation operation, a sand control operation, a completion operation, an acidizing operation, a scale inhibiting operation, a water-blocking operation, a clay stabilizer operation, a fracturing operation, a frac-packing operation, a gravel packing operation, a wellbore strengthening operation, a sag control operation, and combinations thereof.

13. The method of claim 1, further comprising mixing the treatment fluid using mixing equipment and introducing the treatment fluid in to a subterranean formation using one or more pumps.

14. A method comprising:
   providing a treatment fluid selected from the group comprising drilling fluids, spacers, flushes, and efficiency fluids, the treatment fluid comprising:
      an aqueous base fluid;
      ground drilling cuttings; and
      a crosslinking agent selected from the group consisting of a borate ion, a metal ion and combinations thereof; and
   placing the treatment fluid in a subterranean formation;

wherein the ground drilling cuttings provides the treatment fluid a thixotropic rheological behavior that provides significant build-up of gel strength in regions of the subterranean formation having low-shear.

15. The method of claim 14, further comprising mixing the treatment fluid using mixing equipment.

16. The method of claim 14, wherein the treatment fluid is introduced into a subterranean formation using one or more pumps.

17. A method comprising:
providing a lost circulation treatment fluid comprising:
an aqueous base fluid;
ground drilling cuttings; and
a crosslinking agent selected from the group consisting of a borate ion, a metal ion and combinations thereof; and
placing the treatment fluid in a subterranean formation;
wherein the treatment fluid is a lost circulation management solution; and
wherein the thixotropic rheological behavior of the treatment fluid provides significant build-up of gel strength in regions of the subterranean formation having lost circulation zones.

18. A lost circulation treatment fluid comprising:
an aqueous base fluid;
a crosslinking agent selected from the group consisting of a borate ion, a metal ion and combinations thereof; and
ground drilling cuttings;
wherein thixotropic rheological behavior of the treatment fluid provides significant build-up of gel strength in regions of a subterranean formation having lost circulation zones.

19. The treatment fluid of claim 18, further comprising at least one lost circulation material additive selected from the group consisting of granular material, flake material and fibrous material.

20. The treatment fluid of claim 18, further comprising at least one lost circulation material additive selected from the group consisting of: sand, bauxite, ceramic materials, glass materials, polymer materials, polytetrafluoroethylene materials, cured resinous particulates, nut shell pieces, seed shell pieces, fruit pit pieces, wood fibers, composite particulates, fibers of cellulose, carbon fibers, melt-processed inorganic fibers, polymeric fibers, metal oxide fibers, and mixed metal oxide fibers.

* * * * *